UNITED STATES PATENT OFFICE.

JOSEPH H. T. ROBERTS, OF MEOLS, ENGLAND.

PROCESS OF PREVENTING THE ACCUMULATION OF MOISTURE IN DROPS ON GLASS SHEETS.

1,369,708.

Specification of Letters Patent.

Patented Feb. 22, 1921.

No Drawing.

Application filed June 7, 1920. Serial No. 387,201.

*To all whom it may concern:*

Be it known that I, JOSEPH HARRISON THOMSON ROBERTS, a subject of the King of Great Britain and Ireland, and residing at Mayville, Rycroft Road, Meols, Cheshire, England, have invented certain new and useful Improvements Relating to Processes of Preventing the Accumulation of Moisture in Drops on Glass Sheets, of which the following is a specification.

This invention relates to glass and other windows, screens, mirrors, goggles, walls and the like.

It is well known that the material employed in the formation of shop and other windows and for screen and like purposes readily becomes obscured by condensed steam or water vapor in cold or wintry weather or when its opposite faces are exposed to temperatures which differ considerably from one another.

A number of substances have been proposed for use with glass to prevent obscuration by condensation consisting of soaps and soap-like compositions which form with condensed water vapor a liquid solution and are more or less quickly washed away and require renewal.

With the same object it has also been proposed to treat the glass by coating the same with copper oxid mixed with glycerin and a non-drying oil such as sesame oil, calcium chlorid being subsequently added to the mixture.

It has been proposed to reinforce or strengthen glass by the use of gelatin or like substance and celluloid, the strengthening material being interposed between two sheets of glass or being coated upon one side of the sheet only. Such treatment, however, is unsuitable for the purpose for which the present invention is designed and no claim to any such treatment is made herein.

The present invention consists in the treatment of glass and the like to avoid obscuration by condensation of moisture thereon, which comprises coating or protecting the surface of the glass with a layer of a solid transparent substance possessing the property of absorbing water-vapor within itself in the manner of a solid solution, without any appreciable effect upon its transparency or clearness, remaining solid (at ordinary temperatures) even when holding the absorbed water, and able, under appropriate conditions, to give up the water by evaporation. It will be seen that such a substance will need to be practically insoluble in water under the working conditions. Such a substance will continue automatically to exercise its alternative functions of absorption and release of water vapor practically indefinitely, since it is not reduced to a liquid or plastic form by the absorbed water at the ordinary temperatures met with in its service conditions. Substances which exhibit this property in a pronounced degree are those which are able to form "gels" from a warm aqueous solution and these are the type of substance which are preferred according to the present invention, although this invention is not limited to the same but includes all substances coming under the definition given above.

Examples of such substances are albumins (animal and vegetable); gelatins and glues (animal and vegetable); algic jellies, agar, casein, etc.

Casein may be dissolved in a warm acid aqueous solution depositing as a gel when cold.

In carrying my invention into effect in one convenient manner, I coat or otherwise protect one or both surfaces of the glass with a layer of gelatin or any equivalent material capable of absorbing and dissipating moisture.

The gelatin or its equivalent may be brought temporarily to a liquid or plastic form by heating with water or otherwise for convenience of application to glass *in situ* as, for example, to a shop-window front, the gel afterward solidifying.

It will be understood that any suitable means may be adopted for applying the film of gelatin as, for example, it may be deposited by means of a jet, spray, brush, mop or other like device or apparatus, or it may be applied in the manner of a transfer or otherwise and the application may be effected either before or after the glass has been fixed or erected in its service position.

Furthermore, the gelatin may be treated with any other substance capable of producing any desired effect as, for example, I may apply formalin to the gelatin for the purpose of toughening and preserving the same and protecting it against the action of any ordinary temperatures to which the gelatin may be subjected, and for discouraging flies, spiders, etc. Glycerin may be introduced into the gelatin for the purpose of softening and preventing cracking and frosting. Dyes may be introduced into or upon the gelatin for the purpose of producing a tinted light, or for "filtering" the light which passes through it. Substances such as those mentioned may be introduced into the gelatin before the deposition of the film, or may be applied to the film after the deposition.

In addition to being applied to windows or similar transparent objects or material, the treatment herein described may be applied to the interior surface of the walls of public buildings, churches, etc., to prevent the familiar "sweating" of the walls from being apparent.

Having now described my invention what I claim as new and desire to secure by Letters Patent is:—

1. The treatment of glass and the like to avoid obscuration by condensation of moisture thereon which consists in coating or protecting the surface of the glass with a layer of a solid transparent substance capable of absorbing water vapor without any appreciable effect upon its transparency or clearness and remaining solid at atmospheric temperatures and able to give up the water by vaporization, and leaving said coating unprotected.

2. The treatment of glass and the like to avoid obscuration by condensation of moisture thereon which comprises coating or protecting the glass with a layer or film of gelatin, and leaving said layer or film unprotected, substantially as described.

3. A process for preventing the accumulation of moisture in drops on glass sheets, which consists in covering the glass sheet with a transparent gelatinous substance which will absorb the water and prevent its accumulation in drops, and leaving said covering unprotected.

4. The treatment of glass and the like to avoid obscuration by condensation of moisture thereon which consists in coating the surface of the glass with a layer of transparent gelatinous substance possessing the quality of absorbing and dissipating moisture, adding a toughening material to said substance, and leaving said coating unprotected.

In testimony whereof I have signed my name to this specification.

JOSEPH H. T. ROBERTS.